(12) United States Patent
Hasumi et al.

(10) Patent No.: US 6,547,424 B2
(45) Date of Patent: Apr. 15, 2003

(54) VEHICLE FRONT LAMP STEERING CONTROLLED LIGHT DISTRIBUTION SYSTEM

(75) Inventors: Hirofumi Hasumi, Isehara (JP); Takayuki Furuya, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 0 days.

(21) Appl. No.: 09/818,913

(22) Filed: Mar. 28, 2001

(65) Prior Publication Data

US 2001/0026451 A1 Oct. 4, 2001

(30) Foreign Application Priority Data

Mar. 28, 2000 (JP) ........................................ 2000-089941

(51) Int. Cl.[7] .............................................. F21V 21/29
(52) U.S. Cl. ............................ 362/465; 362/40; 362/41
(58) Field of Search ............................... 362/40, 41, 465

(56) References Cited

U.S. PATENT DOCUMENTS

| | | | | |
|---|---|---|---|---|
| 4,663,696 A | * | 5/1987 | Miyazawa et al. | 362/284 |
| 4,733,333 A | * | 3/1988 | Shibata et al. | 362/346 |
| 4,908,560 A | * | 3/1990 | Shibata et al. | 307/10.8 |
| 4,963,794 A | * | 10/1990 | Shibata et al. | 315/81 |
| 5,479,323 A | * | 12/1995 | Shibata et al. | 362/420 |
| 5,526,242 A | * | 6/1996 | Takahashi et al. | 307/10.1 |
| 5,550,717 A | * | 8/1996 | Liao | 362/37 |
| 5,588,733 A | * | 12/1996 | Gotou | 315/79 |
| 5,876,113 A | * | 3/1999 | Gotoh | 362/276 |
| 5,909,949 A | * | 6/1999 | Gotoh | 315/82 |
| 6,010,237 A | * | 1/2000 | Gotou | 362/459 |
| 6,309,094 B1 | * | 10/2001 | Woerner | 362/465 |

FOREIGN PATENT DOCUMENTS

| | | |
|---|---|---|
| JP | 5-23216 | 4/1993 |
| JP | 8-183385 | 7/1996 |
| JP | 11-78675 | 3/1999 |
| JP | 3111153 | 9/2000 |

* cited by examiner

*Primary Examiner*—Sandra O'Shea
*Assistant Examiner*—Ismael Negron
(74) *Attorney, Agent, or Firm*—Foley & Lardner

(57) ABSTRACT

A front lamp steering controlled light distribution system is disclosed having a light distribution means movable to vary a light distribution pattern to right and left maximum limit positions in cornering areas of a vehicle, and a control means responsive to a turned on state of a head lamp switch for actuating the light distribution means to cause the light distribution pattern to be varied according to a steering direction signal, indicative of an incremental steering angle of a steering wheel, in the absence of a vehicle speed signal, indicative of a vehicle speed less than a given value, and operative to drive the light distribution means to cause the light distribution pattern to be fixedly directed to the maximum limit position in response to an indicator direction signal, output from a blinker condition detection means (14), in the presence of the vehicle speed signal.

15 Claims, 8 Drawing Sheets

VEHICLE FRONT LAMP STEERING CONTROLLED LIGHT DISTRIBUTION SYSTEM

BACKGROUND OF THE INVENTION

The present invention relates to a vehicle front lamp light distribution control system and more particularly to a vehicle front lamp light distribution control system capable of raising visibility at the time of cornering by controlling light distribution means of the front lamp.

According to Japanese Patent Publication No. H5-23216, Japanese Patent Application Laid-Open No. H8-183385, Japanese Patent Application Laid-Open No. H11-78675 and Japanese Patent Application Laid-Open No. H8-192674 a vehicle head lamp including a fog lamp is provided with a movable reflector and by turning the movable reflector in the steering direction by an amount corresponding to a steering angle of the steering wheel, the light distribution pattern of the front lamp is changed in the direction of vehicle's turn so as to raise visibility at the time of cornering.

However, according to the aforementioned earlier art, the light distribution pattern of the front lamp is changed in the steering direction of the steering wheel by an amount corresponding to the steering angle when the vehicle turns on an intersection or the like, cornering destination cannot be beamed brightly enough before operating the steering wheel. Therefore, an art capable of beaming the cornering destination prior to operation of the steering wheel has been demanded.

SUMMARY OF THE INVENTION

Accordingly, the present invention has been achieved to meet the above described demands and therefore, an object of the invention is to provide a vehicle front lamp light distribution control system capable of raising visibility at the time of cornering by beaming a turning destination before the steering wheel is operated.

To achieve the above described object, according to a first aspect of the present invention, there is provided a vehicle front lamp light distribution control system comprising: a light distribution means provided on each of front lamps on the right and left sides of a front face of a vehicle for changing beam angles in the right/left direction; a steering wheel condition detecting means for detecting a steering direction and a steering angle of the steering wheel; a blinker condition detecting means for detecting an operating condition and an indication direction of the blinker; and a control means for changing an beam angle of the light distribution means on a side corresponding to the steering direction of the steering wheel in a steering direction of the steering wheel by an amount corresponding to a steering angle thereof by inputting signals from the vehicle velocity detecting means and the blinker condition detecting means, wherein the control means changes the beam angle of the light distribution means on the side corresponding to the indication direction of the blinker in the indication direction to a maximum extent only when the vehicle velocity is lower than a predetermined value and the blinker is operated.

According to the first aspect of the present invention, the beam angle of the light distribution means located on a side corresponding to the indication direction of the blinker can be changed to a maximum extent when the blinker is operated before the steering wheel is operated. Thus, before operating the steering wheel, a turning destination can be beamed brightly so as to raise visibility at the time of cornering. The beam angle of the light distribution means is changed to a maximum extent only when the vehicle velocity is reduced to less than a predetermined value for cornering and then, the blinker is operated. Thus, a case where the blinker is operated for changing a lane while traveling at high speeds is excluded. Thus, unnecessary action of the light distribution means is eliminated thereby improving the durability of the driving portion and eliminating dazzling to other vehicles. In the meantime, if only the steering wheel is operated without operating the blinker, the beam angle of the light distribution means is changed in the steering direction of the steering wheel by an amount corresponding to the steering angle like conventionally. Because the turning destination is not beamed if a driver forgets to operate the blinker, there is an advantage that the driver is urged to operate the blinker.

According to a second aspect of the present invention, there is provided a vehicle front lamp light distribution control system comprising: a light distribution means provided on each of front lamps on the right and left sides of a front face of a vehicle for changing beam angles in the right/left direction; a steering wheel condition detecting means for detecting a steering direction and a steering angle of the steering wheel; a blinker condition detecting means for detecting an operating condition and an indication direction of the blinker; and a control means for changing an beam angle of the light distribution means on a side corresponding to the steering direction of the steering wheel in a steering direction of the steering wheel by an amount corresponding to a steering angle thereof by inputting signals from the vehicle velocity detecting means and the blinker condition detecting means, wherein the control means changes the beam angle of the light distribution means on both the right and left sides only when the vehicle velocity is lower than a predetermined value and the blinker is operated.

According to the second aspect of the present invention, the beam angles of the light distribution means on both the right and left sides are changed to maximum extent outward of each even if any of the right and left blinkers is operated. Therefore, the turning destination can be beamed brightly and at the same time, it is possible to confirm whether or not any vehicle comes from an opposite direction.

According to a third aspect of the present invention, there is provided a vehicle front lamp light distribution control system according to the first or second aspect, further comprising a hazard detecting means for detecting an operating condition of the hazard switch, wherein when the hazard switch is operated, the function for maximizing the beam angle of the light distribution means to a maximum extent is canceled when the blinker is operated even if the vehicle velocity is less than a predetermined value, so that the beam angle of the light distribution means is changed in the steering direction of the steering wheel by an amount corresponding to the steering angle thereof.

When the hazard switch is operated, the vehicle is in emergency traveling condition like pulling a vehicle in trouble. Thus, according to the third aspect of the invention, even if the vehicle velocity is less than a predetermined value, the function of maximizing the beam angle of the light distribution means is canceled, so that the beam angle of the light distribution means is changed in the steering direction of the steering wheel by an amount corresponding to the steering angle.

According to a fourth aspect of the present invention, when the beam angle of the light distribution means is changed to a maximum extent, the beam angle of the light distribution means is changed at a speed higher than the steering angle of the steering wheel.

Because according to the fourth aspect of the present invention, the beam angle of the light distribution means is changed more quickly than the steering angle of the steering wheel when the beam angle of the light distribution means is changed to a maximum extent, the operation of the blinker is delayed so that the blinker is operated at the same time as when the steering wheel is operated or the blinker is operated slightly later than the steering wheel. Consequently, the beam angle of the light distribution means can be changed to the maximum extent.

According to a fifth aspect of the present invention, when returning the light distribution means whose beam angle is changed to a maximum extent, the beam angle is changed at a speed corresponding to a change in the steering angle of the steering wheel.

According to the fifth aspect of the present invention, because the speed of returning the beam angle of the light distribution means changed to the maximum extent is slow, the change in brightness of driver's visibility is small, so that there is no sense of disharmony.

According to a sixth aspect of the present invention, the light distribution means is a movable reflector for changing a diffused light distribution pattern provided above an optical axis of the reflector of the front lamp.

According to the sixth aspect of the present invention, as the light distribution means is a movable reflector provided above an optical axis of the reflector of the front lamp, it is possible to change the diffused light distribution pattern alone in a turning direction while maintaining the concentrated light distribution pattern in the straight advancing direction by means of a reflector other than the movable reflector. Therefore, both the turning direction (an opposite direction also in the aforementioned two aspects) and the straight advancing direction can be beamed brightly.

DETAILED DESCRIPTION OF THE PREFERRED EMBODIMENTS

Figure 1:
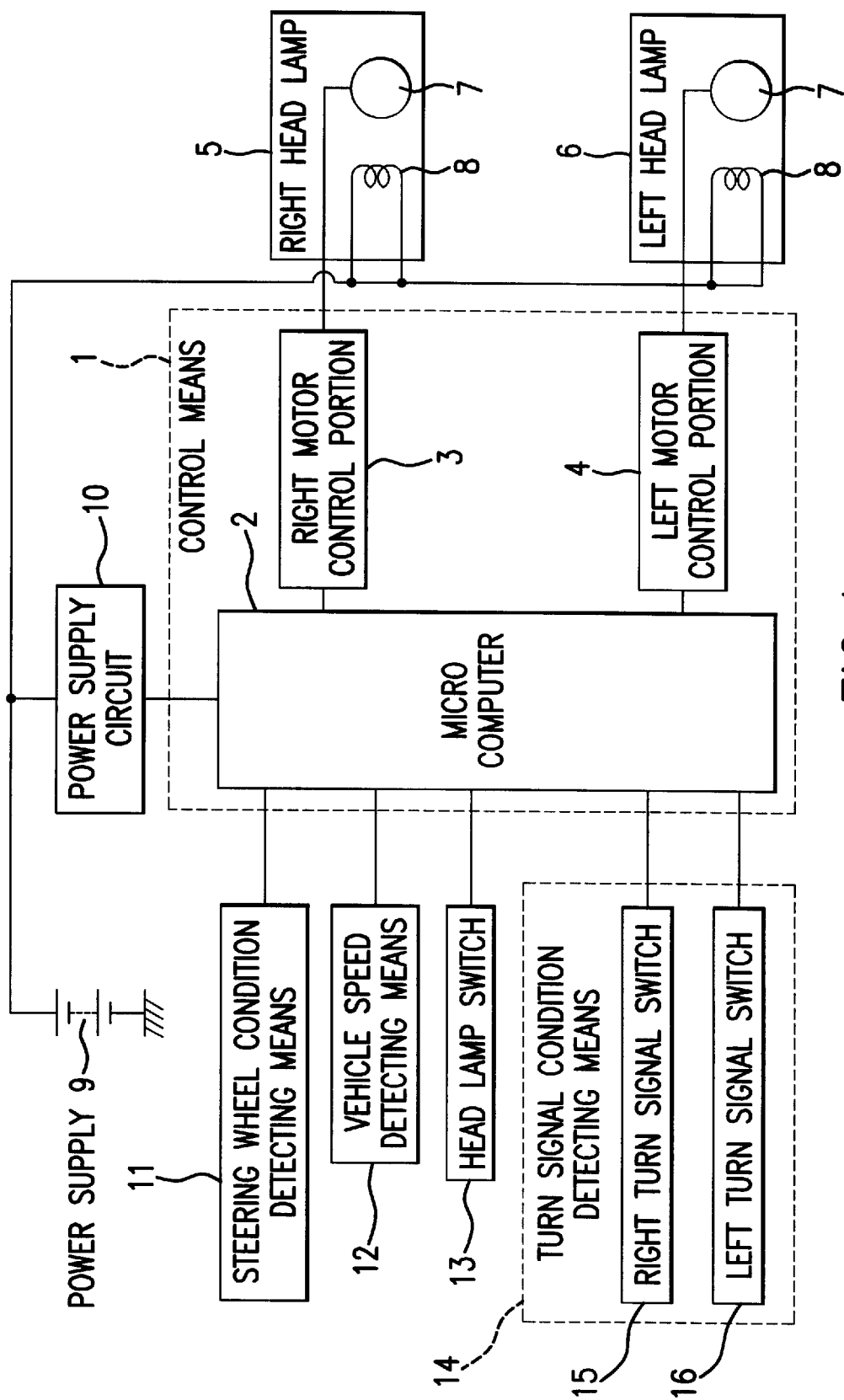
FIG. 1 is a block diagram showing the structure of a first embodiment of the present invention.

Hereinafter, the preferred embodiments of the present invention will be described with reference to the accompanying drawings.

FIGS. 1 to 5 are diagrams showing the first embodiment of the present invention. First, the structure of the embodiment will be described with reference to FIG. 1. A control means 1 comprises a micro computer 2, a right motor control portion 3 and a left motor control portion 4. The right motor control portion 3 and left motor control portion 4 are connected to a right head lamp 5 and left head lamp 6 as each corresponding front lamp. Each head lamp 5, 6 is provided with a stepping motor 7 and a bulb 8. A power supply 9 is connected to not only the bulbs 8 of the head lamps 5, 6 but also the micro computer 2 of the control means 1 through a power supply circuit 10.

Further, a steering wheel condition detecting means 11 for detecting the steering direction and steering angle of the steering wheel, a vehicle velocity detecting means 12 for detecting vehicle velocity, a head lamp switch 13 for turning ON the head lamps 5, 6, and a blinker condition detecting means 14 for detecting blinker operating condition and indicating direction are connected to the micro computer 2. The blinker condition detecting means 14 comprises a right turn signal switch 15 and a left blinker switch 16. The right turn signal switch 15 or left blinker switch 16 is turned into operating condition selectively depending on the direction of turning a blinker lever (not shown).

Figure 2:
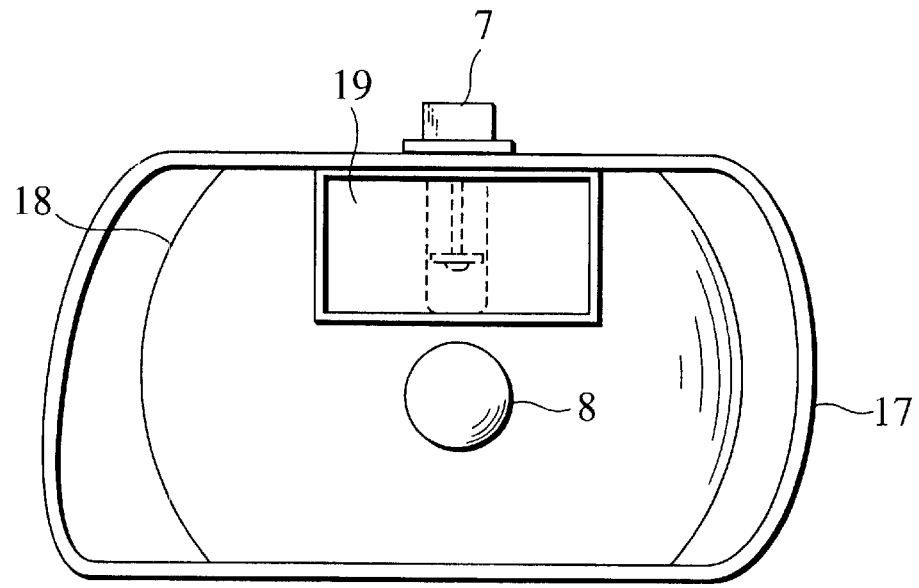
FIG. 2 is a front view showing a head lamp.
Figure 3:
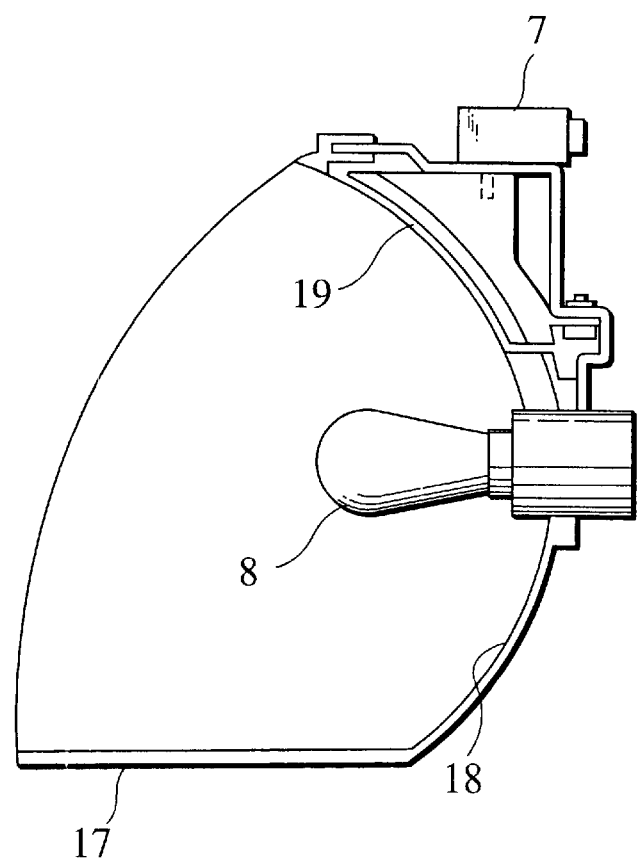
FIG. 3 is a sectional view of the head lamp.

FIGS. 2 and 3 are diagrams showing the structure of the right head lamp 5 on the right side. A unit 17 is provided with a reflector 18, a movable reflector 19 and the bule8. In details, an inner face of the unit 17 acts as the reflector 8 and the bulb 18 is provided in the center thereof. The movable reflector 19 is provided as a light distribution means above the bulb 8. The movable reflector 19 is rotated to the right and left within a predetermined angle range by the stepping motor 7 provided on the top of the unit 17. More specifically, the stepping motor 7 has four phases and rotates the movable reflector 19 for distributing diffused light at an angle of 0.150° for every step of the stepping motor 7. The rotation range of the movable reflector 19 is 30° in each direction of the right and left from the front, totaling 60°. The rotation speed of the movable reflector 19 is 60°/sec (the driving frequency of the stepping motor 7 is 400 pps). The reflector 18 is fixed and indicates a concentrated light distribution pattern for projecting light of the bulb 8 far in a straight direction. The movable reflector 19 located above the bulb 8 indicates a diffused light distribution pattern for beaming a range nearby with a wide angle.

Thus, it is possible to change the diffused light distribution pattern alone in a turning direction by means of the movable reflector 19 while maintaining the concentrated light distribution pattern in the straight advancing direction by means of the fixed reflector 18.

Figure 4:
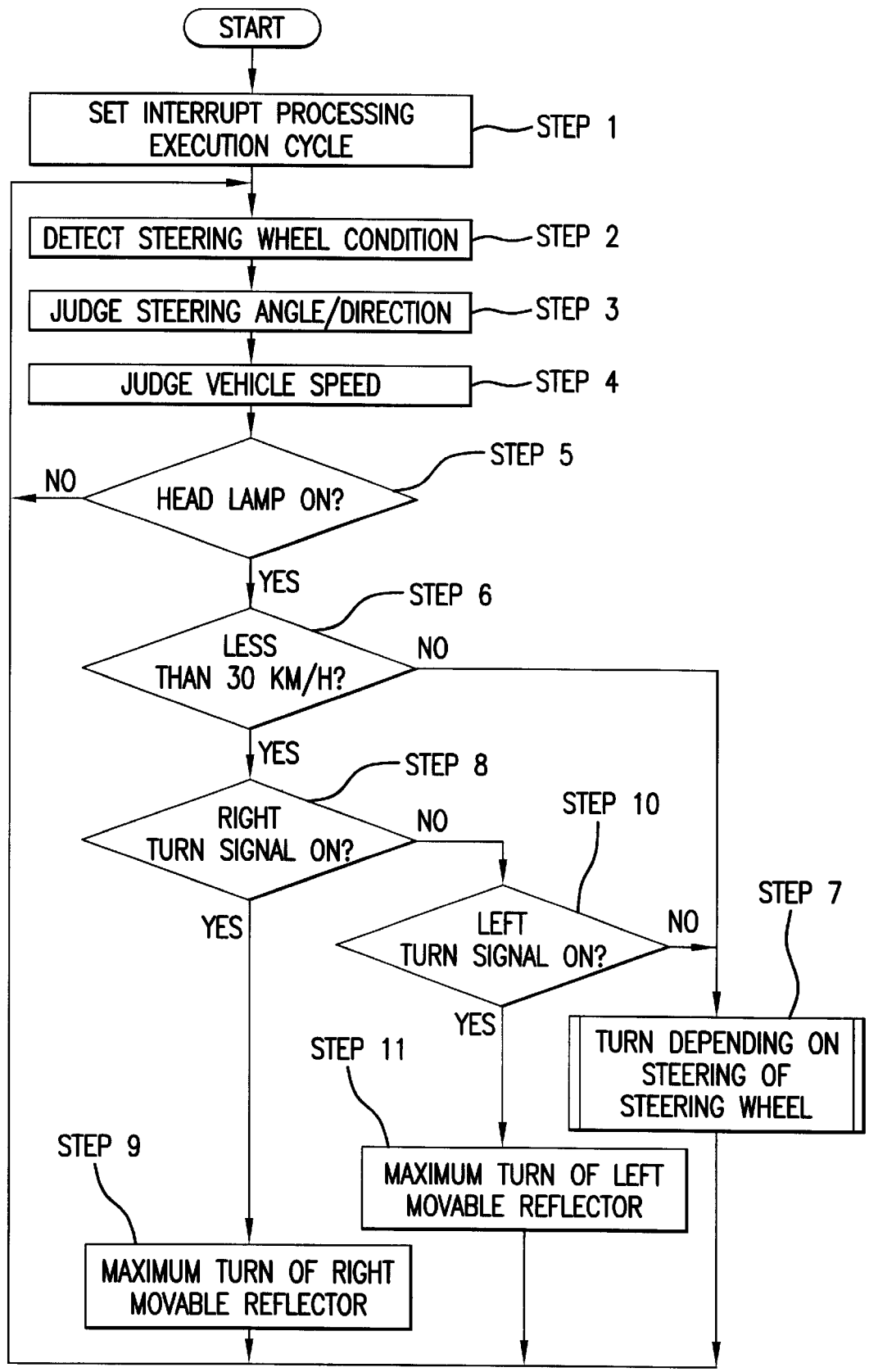
FIG. 4 is a flow chart showing control according to the first embodiment.

Next, a control flow with the control means 1 will be described with reference to the flow chart of FIG. 4. First, in interruption processing execution frequency setting of step 1, the driving frequency of the stepping motor 7 is set up. Because the driving frequency is 400 pps, the frequency is set to 25 msec. In step 2, a signal detected by the steering wheel condition detecting means 11 is read out and in step 3, the steering direction and steering angle are determined. In step 4, vehicle velocity is read by the vehicle velocity detecting means 12 so as to determine vehicle velocity. Next, in step 5, whether the head lamps (H/L) 5, 6 are ON or OFF is determined and if OFF, the processing returns to step 2. If ON, the processing proceeds to step 6, in which whether or not the vehicle velocity is below a predetermined value (30 km/h) is determined.

If the vehicle velocity is higher than 30 km/h, in step 7, the movable angle of the movable reflector 19 is unconditionally calculated with respect to the steering angle of the steering wheel so as to set up target pulse values of the movable reflectors 19 in the head lamps 5, 6 in the steering direction. If the steering wheel is turned to the right, the movable reflector 19 of the head lamp 5 on the right is turned to the right by an amount corresponding to the steering angle of the steering wheel. If the steering wheel is turned to the left, the movable reflector 19 of the head lamp 6 on the left is turned to the left by an amount corresponding to the steering angle of the steering wheel.

Then, if it is determined that the vehicle velocity is less than 30 km/h in step 6, a right blinker signal is recognized in step 8. If the right blinker is ON, the target pulse value (Rt) of the movable reflector 19 is set to 400 which is a maximum value on the right side in step 9 and then, the processing returns to step 2. If the right blinker is OFF, a left blinker signal is recognized in step 10. If the left blinker is ON, the target pulse value (Lt) of the movable reflector 19 is set to 0, which is a maximum value on the left side and then, the processing returns to step 2. If the left blinker is also OFF, the processing goes to step 7, in which the same processing as when the vehicle velocity is higher than 30 km/h is carried out and then, the processing returns to step 2.

Figure 5:
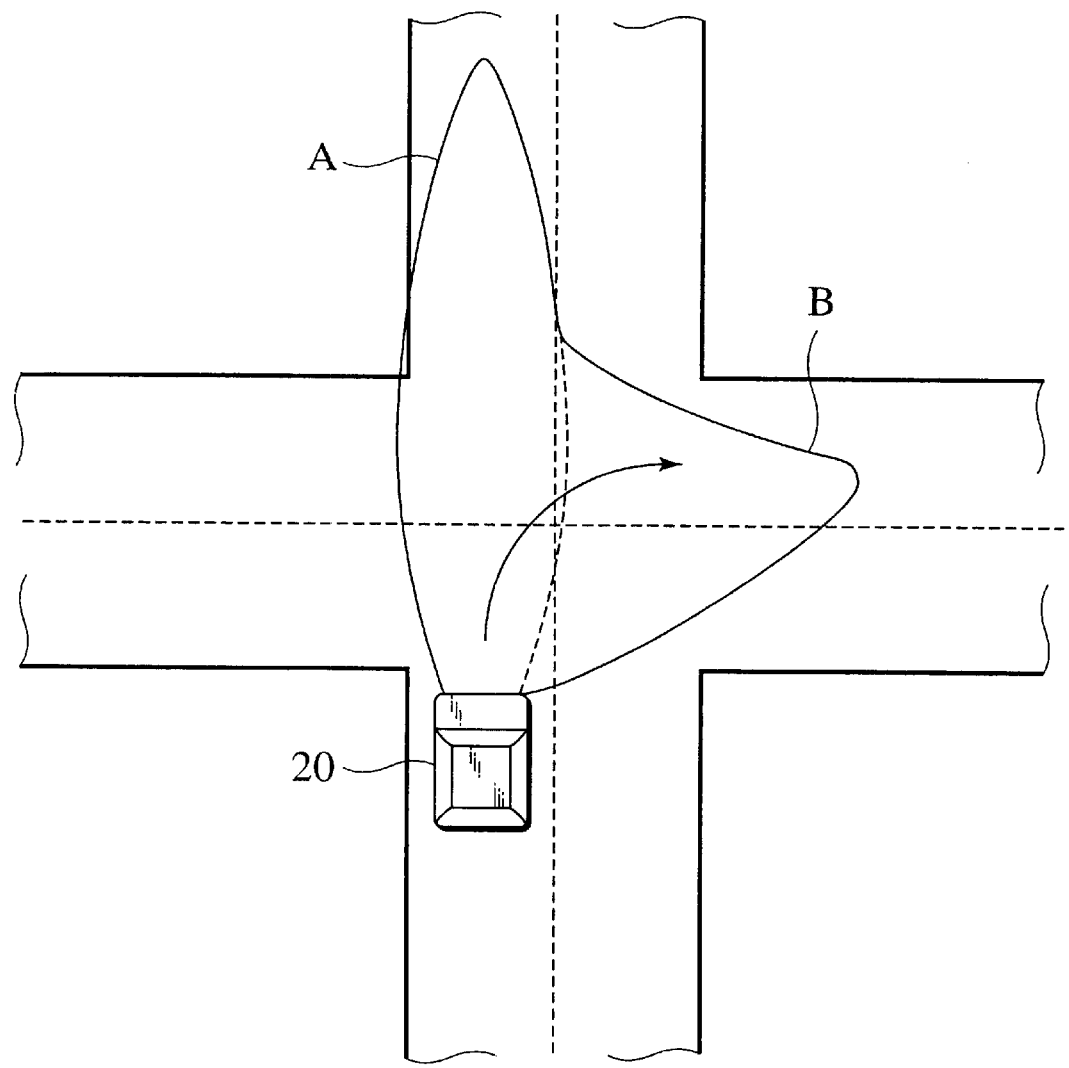
FIG. 5 is a plan view of an intersection showing light distribution pattern of the first embodiment.

As described above, according to this embodiment, it is so controlled that when the right blinker is operated, the movable reflector 19 of the right head lamp 5 is at the maximum angle to the right and when the left blinker is operated, the movable reflector 19 of the left head lamp 6 is at the maximum angle to the left. FIG. 5 shows a condition that the right blinker is operated so as to turn the vehicle 20 to the right at an intersection. Because only the right head lamp 5 and the movable reflector 19 are turned, the reflector 18 of the right head lamp 5, and the reflector 18 and movable reflector 19 of the left head lamp 6 remain oriented to the straight advancing direction. Therefore, it is possible to beam a turning direction by turning the diffused light distribution pattern B to the right while maintaining the concentrated light distribution pattern A in the straight advancing direction. Because a turning destination can be beamed at a blinker operating stage before the steering wheel is operated, visibility at the time of cornering can be intensified. The diffused light distribution pattern B is changed only when the vehicle velocity is lowered to less than a predetermined value for cornering so as to operate the blinker and a case where the blinker is operated to change a lane while traveling at high speeds is excluded. Therefore, unnecessary action of the stepping motor 7 for each of the head lamps 5, 6 is eliminated thereby improving the durability of the movable reflector 19 and the like and eliminating dazzling to other vehicle. Further, because if a driver forgets operation of the blinker, the turning destination is not beamed, there is an effect that the driver is urged to operate the blinker.

The rotation speed of the movable reflector 19 is not fixed, but may be increased more by detecting the steering speed of the steering wheel (may be increased twice for example). As a result, even if the operation of the blinker is delayed so that it is operated at the same time when the steering wheel is operated or the blinker is operated slightly later than the steering wheel is operated, there is obtained an effect that an beam angle of the movable reflector 19 is changed to a maximum angle.

Then, in case where the movable reflector 19 is rotated quickly up to the maximum angle, the reflector is preferred to be returned slowly at a speed corresponding to the speed of the steering angle of the steering wheel. As a result, the change in brightness of driver's visibility is small so that there is no sense of disharmony.

Figure 6:
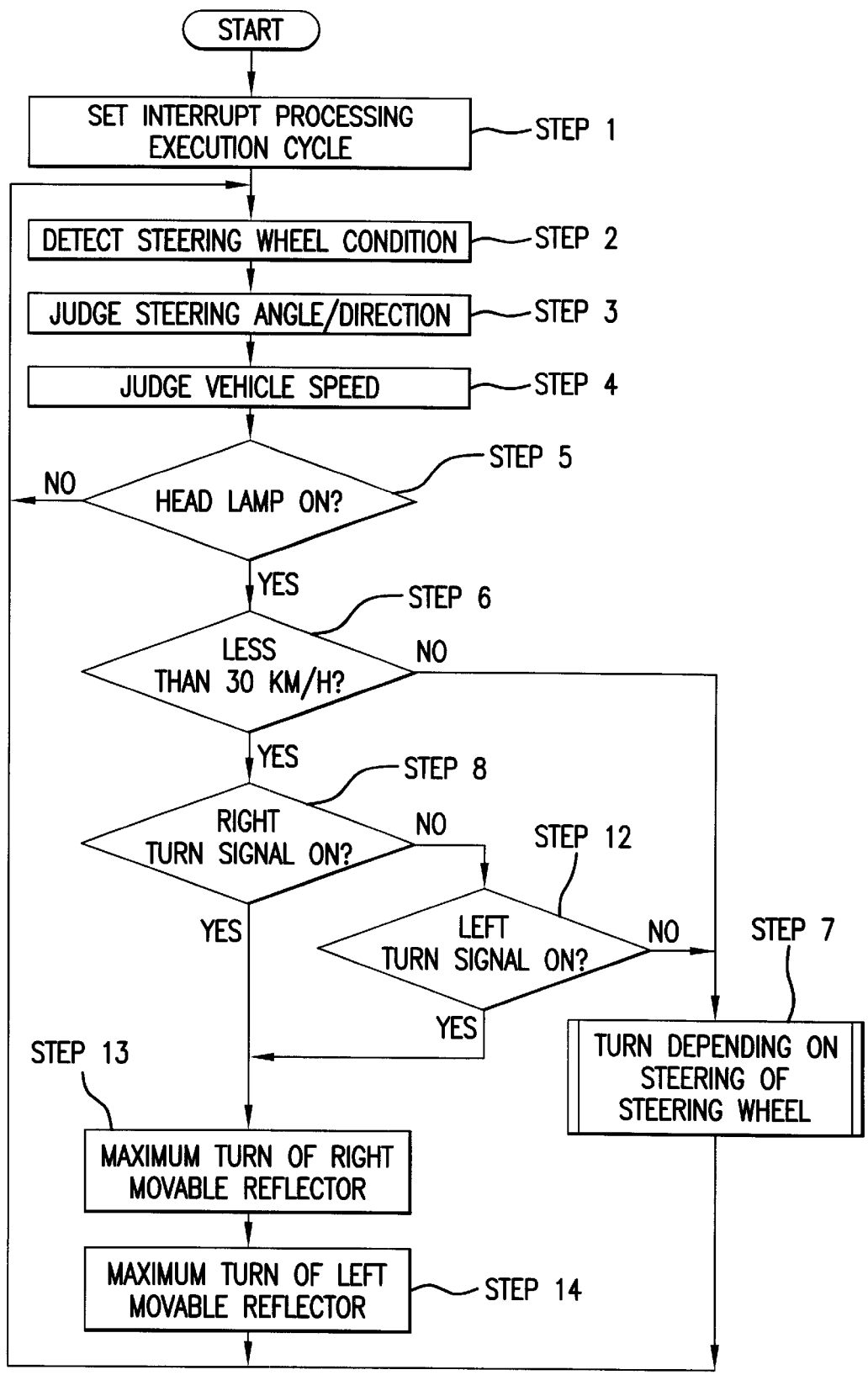
FIG. 6 is a flow chart showing control according to a second embodiment.
Figure 7:
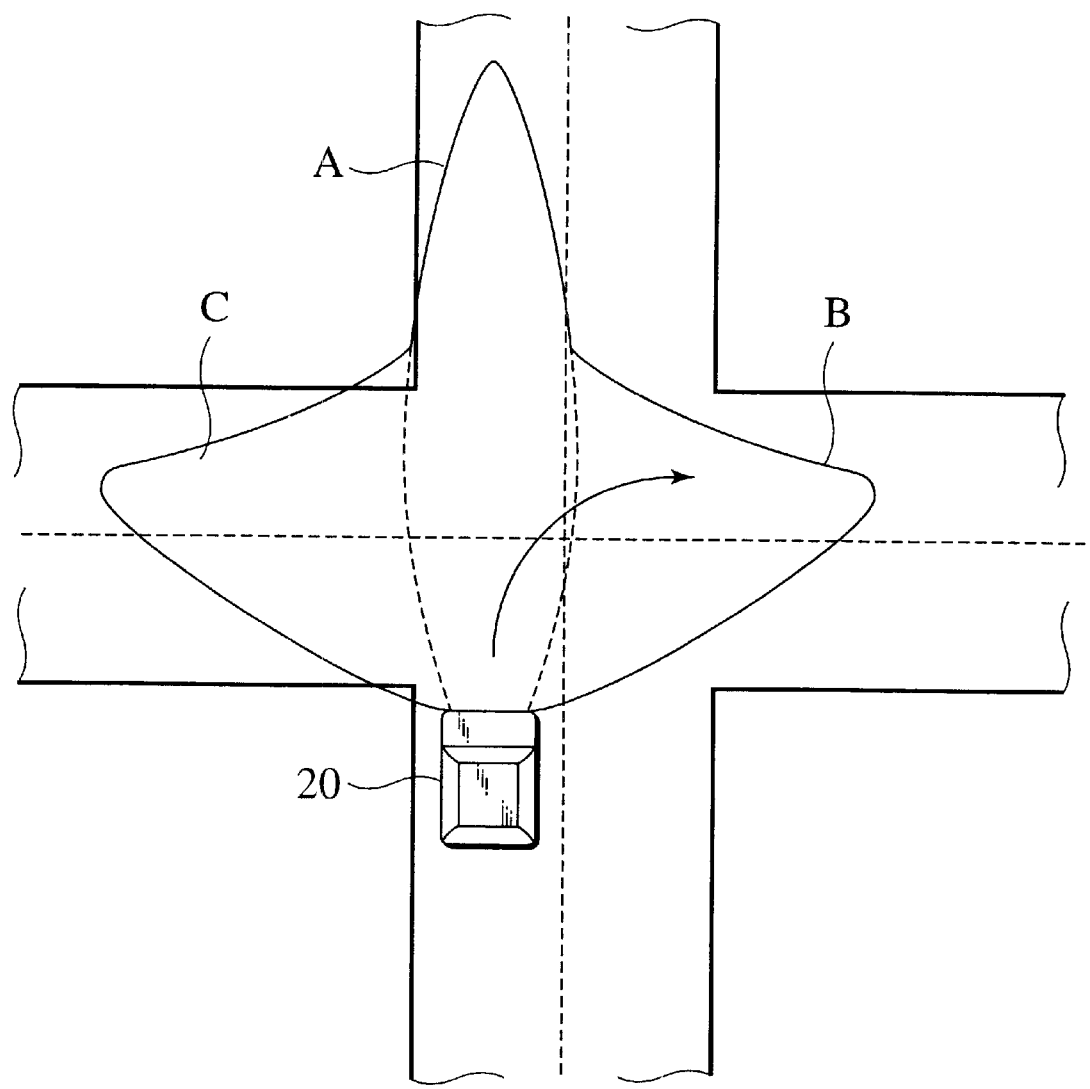
FIG. 7 is a plan view of an intersection showing light distribution pattern of the second embodiment.

FIGS. 6 and 7 are diagrams showing a second embodiment of the present invention. Step 1 to step 8 of a flow chart of FIG. 6 are the same as the first embodiment. A different point is that when the right blinker is ON in step 8 or when the left blinker is ON in step 12, the target pulse value (Rt) of the right movable reflector 19 is set to 400, which is a maximum value on the right side while the target pulse value (Lt) of the left movable reflector 19 is set to 0, which is a maximum value on the left side. Therefore, the both movable reflectors 19 are changed to a maximum extent in outward direction if any of the right and left blinkers is operated. Consequently, the turning destination can be beamed brightly and at the same time, it can be recognized that no vehicle or the like comes from an opposite side. That is, FIG. 7 shows a condition that when a driver intends to turn the vehicle 20 to the right at an intersection, the right blinker is operated. In this case, not only the diffused light distribution pattern B to the right but also the diffused light distribution pattern C to the left can be obtained, so that the safety can be confirmed more easily.

Figure 8:
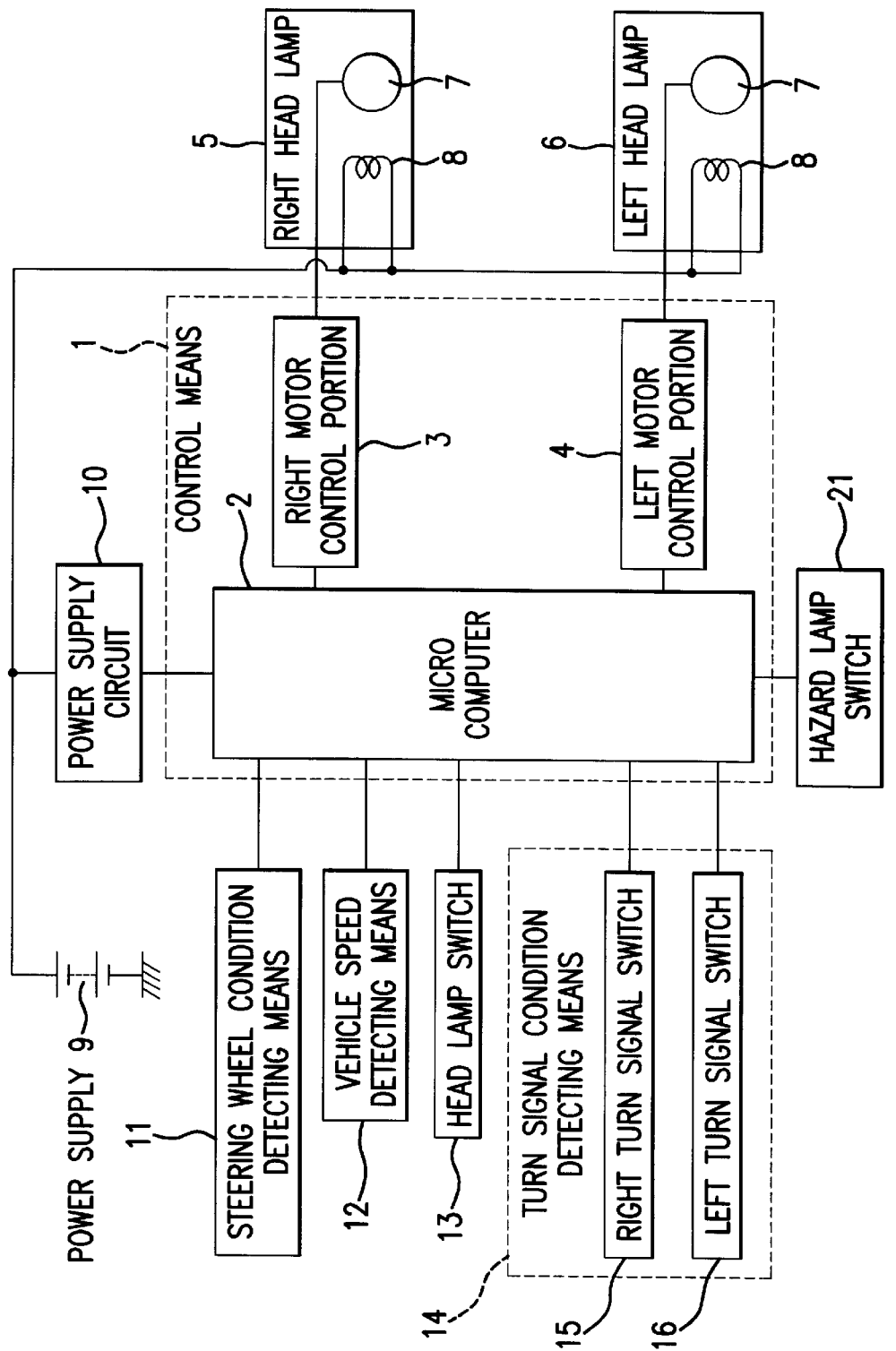
FIG. 8 is a block diagram showing the structure of a third embodiment.
Figure 9:
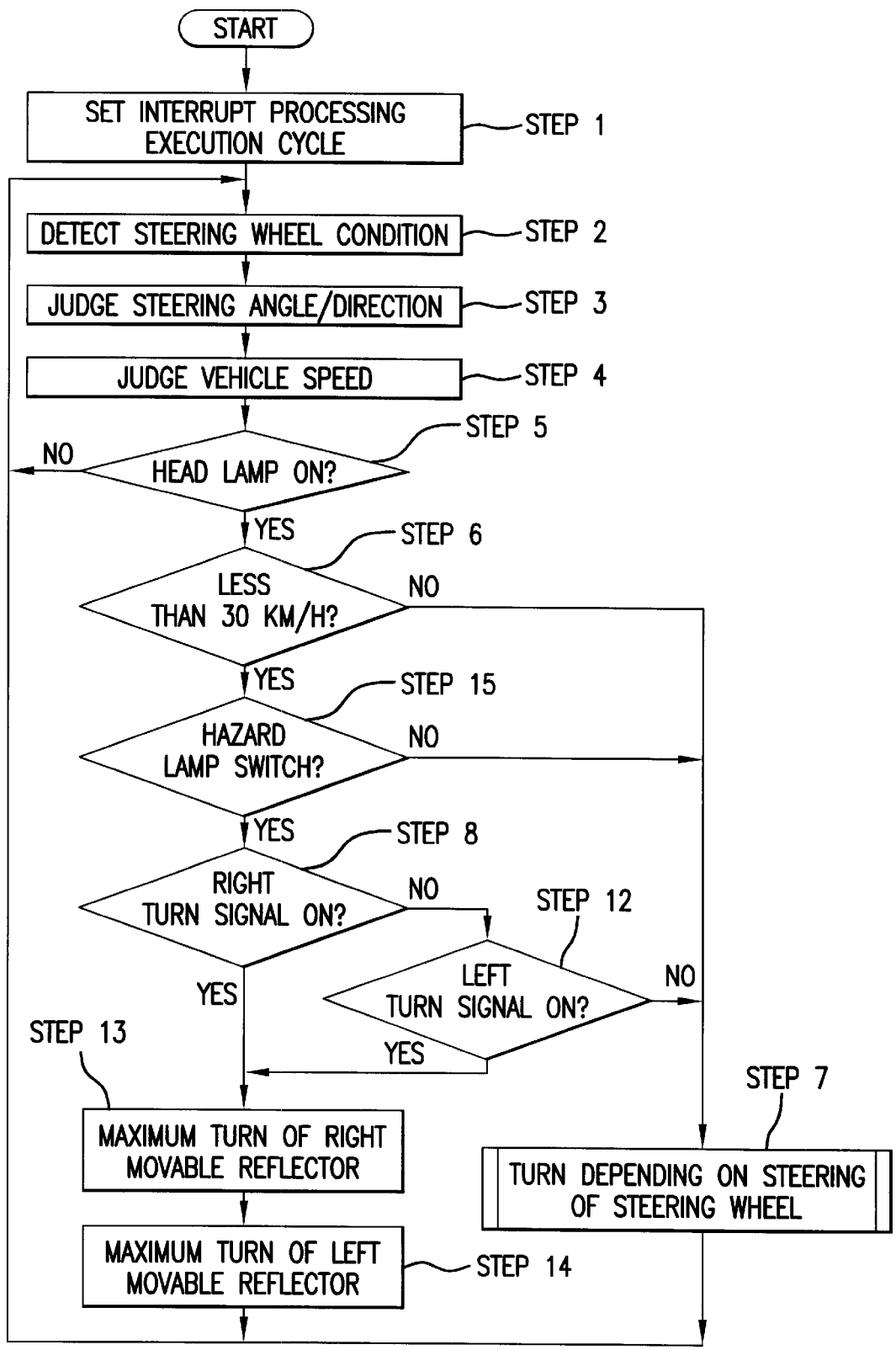
FIG. 9 is a flow chart showing control according to a third embodiment.

FIGS. 8 and 9 are diagrams showing a third embodiment of the present invention. According to the third embodiment, as shown in FIG. 8, a hazard switch 21 is connected to the control means 1. Then, the flow chart of FIG. 9 is the same as the second embodiment except that a step 15 for determining whether the hazard switch 21 is ON or OFF.

When the hazard switch 21 is operated, the vehicle is in emergency traveling condition like pulling a vehicle in trouble. Thus, by adding the step 15 about the hazard switch 21, even if the vehicle velocity is as low as less than 30 km/h, the function of maximizing the rotation of the movable reflector 19 by operating the blinker is canceled, so that movable reflector 19 is turned by an amount corresponding to the steering angle of the steering wheel in its steering direction. Therefore, when a vehicle is in such emergency traveling condition like pulling another vehicle in trouble, it never dazzles the other vehicles.

What is claimed is:

1. A front lamp steering controlled light distribution system for a vehicle having a steering wheel, comprising:

light distribution means provided on each of right and left head lamps of the vehicle and having a movable reflector to provide a light distribution pattern at a front area of the vehicle and operative to allow the light distribution pattern to be directed to at least one of right and left maximum limit positions in cornering areas of the vehicle;

steering wheel condition detecting means for producing a steering direction signal varying in dependence on a steering angle in which the steering wheel is steered;

blinker condition detecting means for producing an indicator direction signal indicative of one of right and left turns in the respective cornering areas;

vehicle speed detecting means for producing a vehicle speed signal when a vehicle speed is below a given level;

head lamp switch means for turning on or turning off the head lamps; and control means responsive to a turning on state of the head lamp switch means for actuating the movable reflector to cause the light distribution pattern to be varied at an angle according to the steering direction signal in the absence of the vehicle speed signal and operative to drive the movable reflector to allow the light distribution pattern to be fixedly directed to at least one of the right and left maximum limit positions in response to the indicator direction signal in the presence of the vehicle speed signal.

2. A front lamp steering controlled light distribution system as claimed in claim 1, further comprising:

hazard detecting means for producing a hazard indication signal indicative of a hazard switch being operated, wherein the control means is operative to cancel control of the light distribution means in response to the hazard indication signal for thereby causing the light distribution means to vary the light distribution pattern at the angle in dependence on the steering direction signal even in the presence of the vehicle speed signal.

3. A front lamp steering controlled light distribution system as claimed in claim 1, wherein the movable reflector provides a diffused light distribution pattern above an optical axis of a reflector of the head lamps.

4. A front lamp steering controlled light distribution system as claimed in claim 1, wherein during operation of the control means, the light distribution means is actuated at a speed higher than a steering motion of the steering wheel.

5. A front lamp steering controlled light distribution system as claimed in claim 4, wherein when returning the light distribution means to an original operating position, the light distribution means is actuated at a speed corresponding to a change in a steering motion of the steering wheel.

6. A front lamp steering controlled light distribution system for a vehicle having a steering wheel, comprising:

light distribution means provided on each of right and left head lamps of a vehicle and having a movable reflector to provide a light distribution pattern at a front area of the vehicle and operative to allow the light distribution pattern to be directed to at least one of right and left maximum limit positions in cornering areas of the vehicle;

steering wheel condition detecting means for producing a steering direction signal varying according to a steering angle in which the steering wheel is steered;

blinker condition detecting means producing an indicator direction signal indicative of one of right and left turns in the cornering areas;

a vehicle speed sensor producing a vehicle speed signal when a vehicle speed is less than a given low level;

head lamp switch means for turning on or turning off the head lamps; and control means responsive to a turning on state of the head lamp switch means for actuating the movable reflector to cause the light distribution pattern to be varied at an angle according to the steering direction signal in the absence of the vehicle speed signal and operative to drive the movable reflector to allow the light distribution pattern to be fixedly directed to the right and left maximum limit positions in response to the indicator direction signal in the presence of the vehicle speed signal.

7. A front lamp steering controlled light distribution system as claimed in claim 6, further comprising:

a hazard detecting means for producing a hazard indication signal indicative of a hazard switch being operated, wherein the control unit is operative to cancel control of the light distribution means in response to the hazard indication signal for thereby causing the light distribution means to vary the light distribution pattern at the angle in dependence on the steering direction signal even in the presence of the vehicle speed signal.

8. A front lamp steering controlled light distribution system as claimed in claim 6, wherein during operation of the control means, the light distribution means is actuated at a speed higher than a steering motion of the steering wheel.

9. A front lamp steering controlled light distribution system as claimed in claim 6, wherein the movable reflector provides a diffused light distribution pattern above an optical axis of a reflector of the head lamps.

10. A front lamp steering controlled light distribution system for a vehicle having a steering wheel, comprising:

a light distributor for changing beam angles in the left and right direction; and a controller for actuating the light distributor to change the beam angle of the light distributor on a side corresponding to a steering direction of the steering wheel by an amount corresponding to a steering angle, wherein the controller actuates the light distributor to change the beam angle on a side corresponding to an indication direction of a blinker to a maximum value when the vehicle speed is lower than a predetermined value, unless a hazard switch is activated in which case the controller does not actuate the light distributor.

11. The front lamp steering controlled light distribution system as claimed in claim 10, further comprising:

a steering detector for detecting the steering angle of the steering wheel, said controller receiving a signal from said steering detector indicative of the steering angle.

12. The front lamp steering controlled light distribution system as claimed in claim 10, further comprising:

a blinker detector for detecting the indication direction of the blinker;

said controller receiving a signal from said blinker detector indicative of the indication direction of the blinker.

13. The front lamp steering controlled light distribution system as claimed in claim 10, further comprising:

a hazard detector for detecting activation of the hazard switch;

said controller receiving a signal from said hazard detector indicative of the activation of the hazard switch.

14. The front lamp steering controlled light distribution system as claimed in claim 10, further comprising:

a speed detector for detecting the vehicle speed;

said controller receiving a signal from said speed detector indicative of the vehicle speed.

15. A method of controlling light distribution of vehicle headlamps in a vehicle, comprising:

detecting an indication direction of a blinker;

detecting activation of a hazard switch;

detecting vehicle speed;

detecting a steering angle of a steering wheel; and changing a beam angle of a light distributor on a side corresponding to the indication direction of the blinker to a maximum value when the vehicle speed is lower than a predetermined value, unless the hazard switch is activated in which case the beam angle is not changed even though the vehicle speed is lower than the predetermined value.

* * * * *